(12) United States Patent
Schlienger et al.

(10) Patent No.: US 6,257,447 B1
(45) Date of Patent: Jul. 10, 2001

(54) PRECISION POWDER FEEDER

(75) Inventors: M. Eric Schlienger; David T. Schmale, both of Albuquerque; Michael S. Oliver, Sandia Park, all of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/345,600

(22) Filed: Jun. 29, 1999

(51) Int. Cl.[7] ........................................................ B67D 5/08
(52) U.S. Cl. ................. 222/55; 222/63; 222/109; 222/161; 222/163; 222/630; 222/198; 222/144.5; 222/145.1
(58) Field of Search .......................... 222/55, 63, 109, 222/161, 163, 630, 198, 144.5, 145.1

(56) References Cited

U.S. PATENT DOCUMENTS

| | | | |
|---|---|---|---|
| 2,273,330 | * | 2/1942 | Robinson ............................ 222/55 |
| 2,969,893 | * | 1/1961 | Peeters ............................ 222/55 X |
| 3,308,898 | * | 3/1967 | Allen et al. ...................... 222/55 X |
| 4,354,622 | * | 10/1982 | Wood ................................ 222/55 |
| 5,024,352 | * | 6/1991 | Gmur et al. ..................... 222/55 X |
| 5,380,957 | * | 1/1995 | Giles ............................... 222/55 X |
| 5,834,707 | * | 11/1998 | Wirth .............................. 222/55 X |
| 6,094,994 | * | 8/2000 | Satake et al. ................... 222/55 X |

* cited by examiner

Primary Examiner—Kenneth Bomberg
(74) Attorney, Agent, or Firm—Brian W. Dodson

(57) ABSTRACT

A new class of precision powder feeders is disclosed. These feeders provide a precision flow of a wide range of powdered materials, while remaining robust against jamming or damage. These feeders can be precisely controlled by feedback mechanisms.

36 Claims, 5 Drawing Sheets

PRECISION POWDER FEEDER

This invention was made with Government support under Contract DE-AC04-94DP85000 awarded by the U.S. Department of Energy. The Government has certain rights in the invention.

BACKGROUND

The present invention relates generally to devices to deliver powder for a process, and more specifically to a new class of powder feeders which deliver a wide range of powdered materials at a substantially constant rate.

Traditional powder feeders incorporate as part of their action the movement of powder between moving surfaces. Examples include screws, gear teeth, rotating perforated disks, or other such mechanisms which move the powder from a reservoir at a substantially constant rate. Tight mechanical tolerances are required so that such devices can provide a controlled feed rate, but these same tolerances render the device susceptible to jamming as powder collects in bearings or between moving surfaces. In addition, if hard or abrasive powders are to be delivered, the rate of wear of the mechanical components of the powder feeder can be unacceptably large. Wear is not only to be avoided for the survival of the powder feeder, but also to avoid contaminating the powder being fed. Alternately, overly soft powders can agglomerate and clog these mechanisms.

Jamming in conventional powder feeders is also exacerbated by feeding powder with a range of particle sizes. If the powder size is smaller than the separation between the moving metal surfaces in the feeder, it can collect, e.g., between bearing surfaces, causing damage and contamination of the powder by galling. If the powder size is too large, individual particles can jam and/or break the apparatus.

There is a need for a powder feeder which is robust in operation, and can supply a precisely defined and controlled delivery of powder. Desirable characteristics for such a powder feeder, based on the difficulties seen in prior art feeders, would include a minimum of moving parts, a delivery mechanism suited to feedback control of delivery rate, and a mechanism which does not undergo damage when the powder flow becomes jammed. More preferably, the feeder should possess a mechanism through which the feeder can be unjammed with a minimum of interruption.

SUMMARY

The present invention is of a precision powder feeder in which a powder falls from a powder reservoir through an orifice. The powder flow then impinges on a powder disperser, which can take the form of an inclined ramp. The flow then fans out into a cone-shaped sheet on said ramp. A powder collector is then moved in and out of the path of the sheet of powder, collecting that portion of the powder which falls into the collector and delivering it to the apparatus being served by the powder feeder. The collector position can be controlled by a feedback signal obtained from a powder mass rate sensor, thereby providing a constant rate of flow.

DETAILED DESCRIPTION

Figure 1:
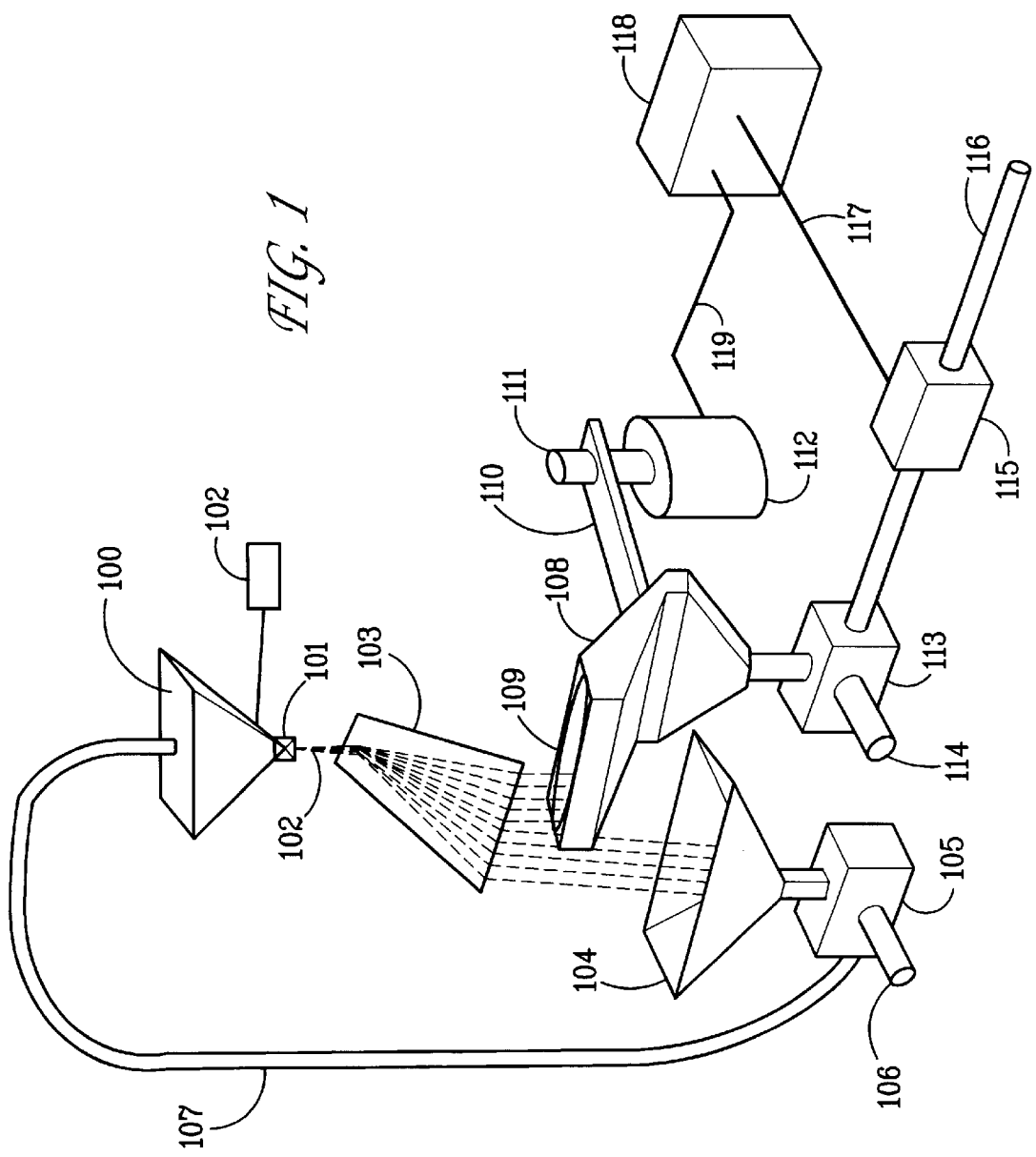
FIG. 1 shows a schematic diagram of a precision powder feeder according to the present invention.

A precision powder feeder according to the present invention is shown in FIG. 1. Powder reservoir 100 directly feeds orifice 101 by gravity flow aided by fluidization of the powder in said reservoir through the action of vibrator 120 on said reservoir. Powder drops through orifice 101 at a substantially constant rate of flow, thereby forming powder flow 102. Powder flow 102 is incident on powder disperser 103, which in this implementation is a substantially flat inclined plane. In the process of sliding down powder disperser 103, the flow of powder 102 spreads out into a cone-shaped sheet. Studies of such particle flows have shown the resulting distribution of powder to be quite stable over a considerable range of operating conditions. As the flow reaches the edge of the powder disperser, the flow density varies as a function of position across the edge, but is substantially constant at any one position as a function of time.

Positioned below the output edge of powder disperser 103 is waste powder collector 104, positioned so as to collect substantially all portions of the flow of powder 102 which are not diverted to feeder output 116 of the powder feeder. In the implementation shown in FIG. 1, this waste powder is directed into waste powder gas entrainment device 105, where it is mixed with a carrier gas added through inlet 106, and then returned to the powder reservoir 100 via waste powder return manifold 107.

A portion of the flow of powder 102 which falls from the output edge of powder disperser 103 is collected through collection aperture 109 by powder collector 108. The powder collector is mounted on strut 110, which itself is rotably mounted on shaft 111 and can be rotated through the action of drive/encoder 112. This allows the powder collector to collect a portion of the flow of powder 102 which varies according to the degree of rotation about shaft 111.

The powder collected by the powder collector is directed to powder entrainment device 113, where it is thoroughly mixed with carrier gas added through inlet 114. The resulting powder-gas mixture is eventually directed to the feeder output 116.

One of the goals for powder feeders according to the present invention is to minimize the role of moving parts in the delivery of powder, while maintaining the rate of delivery at a substantially constant value. The powder feeder as described to this point functions remarkably well, despite having no moving parts during routine operation.

There are some classes of applications for powder feeders, however, that require a higher degree of control over and uniformity of the powder flow output. To serve such applications, a feedback control system can be added to the powder feeder.

The rate at which carrier gas is added to the powder entrainment device is measured by a gas flow sensor (not shown). This powder-gas mixture is directed toward a mass flow sensor 115, which measures the total mass flow of the powder-gas mixture. From the mass flow sensor 115, the powder-gas mixture is directed to feeder output 116.

The difference between the total mass flow and the rate of carrier gas addition is the powder flow rate. This data is transferred to feedback controller 118 through cabling means 117. Feedback controller 118 compares the actual powder flow rate to a target powder flow rate, and sends a correction to drive 112. If the powder flow rate is too small, the drive rotates shaft 111 in a clockwise direction, so that more of the flow of powder 102 enters collection aperture 109, and vice versa. This type of feedback control mechanism has proven extremely reliable in powder feeders after the present invention. Note that, although some relative motion of parts is required to implement the feedback control, this motion is not the type that leads to clogging or jamming of the powder feeder.

Although powder feeders as described above operate well, they are not the only manner in which the present invention can be implemented. FIG. 2 shows alternate approaches toward fluidization of the powder in the powder reservoir 100. Of course, one approach is not to attempt to fluidize the powder. Many powders will flow perfectly well without such fluidization. If it is useful, however, other approaches to fluidization than vibration of the reservoir can be used instead of or in addition to vibrator 120.

Figure 2A:
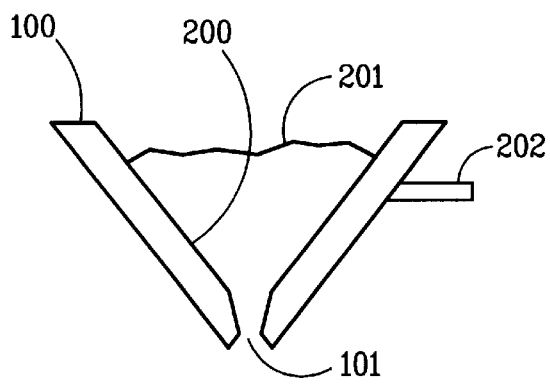
FIGS. 2a & 2b illustrates several implementations of a powder fluidization mechanism according to the present invention.

FIG. 2a shows a approach toward injecting gas directly into the powder near the orifice 101 so as to effectively fluidize said powder. Here we have a powder reservoir 100 with a hollow wall, a portion 200 of which is porous. A mass of powder 201 partially fills the reservoir, eventually to pass through orifice 101 under the influence of gravity (hydrodynamic effects can enter as well when gas injection is used). When gas is injected into the interior of reservoir 100 via inlet 202, some gas escaped through the porous inner wall 200. This gas fluidizes the powder near the orifice 101, thereby enabling smoother and more consistent flow.

Figure 2B:
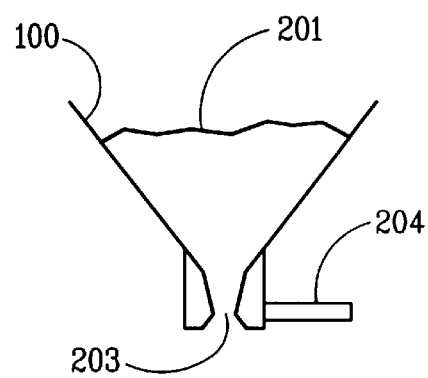

FIG. 2b shows a different structure aimed at the same result, that of fluidization of the powder near the orifice 101. Here powder 201 is held within a simple reservoir 100, which is closed at the bottom by nozzle 203. Nozzle 203 comprises an orifice for escape of the powder, a hollow portion fed with gas through inlet 204, and at least a single nozzle which releases gas into the powder near the orifice. Again, the gas so injected serves to fluidize the powder near the orifice.

Figure 3:
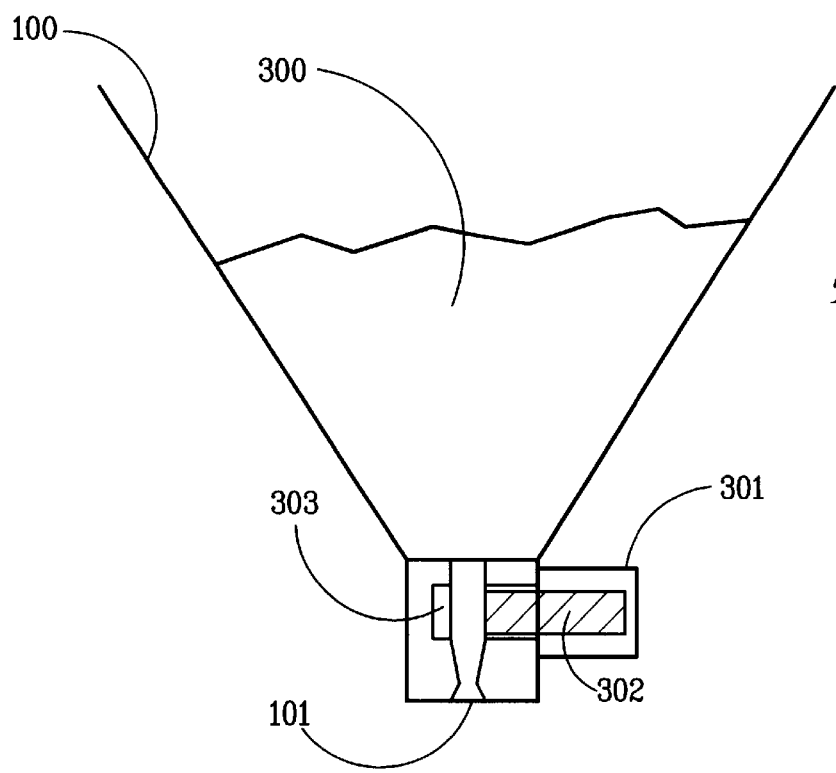
FIG. 3 illustrates a powder flow cutoff mechanism suited to the present invention.
Figure 4C:
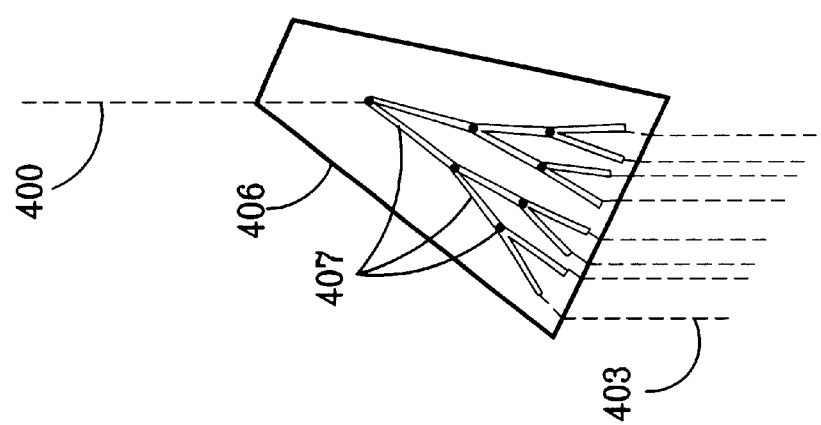
FIGS. 4a, 4b & 4c illustrates several implementations of a powder disperser according to the present invention.
Figure 4B:
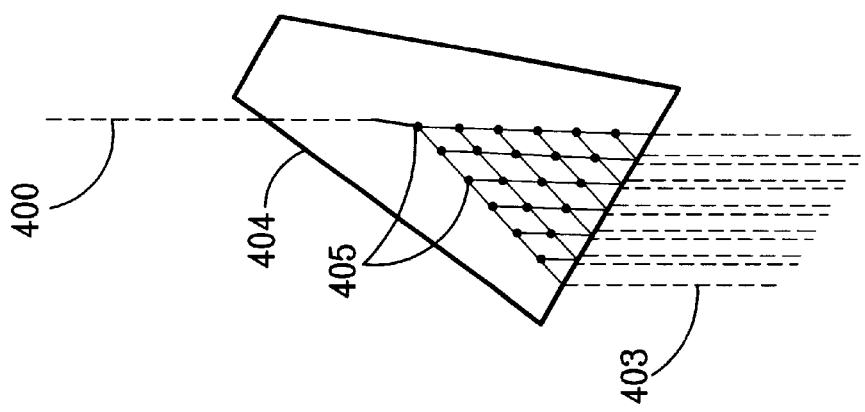
Figure 4A:
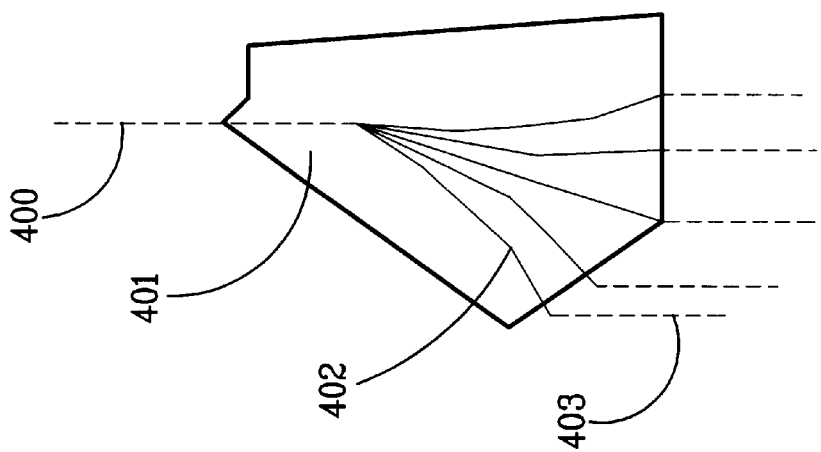
Figure 5:
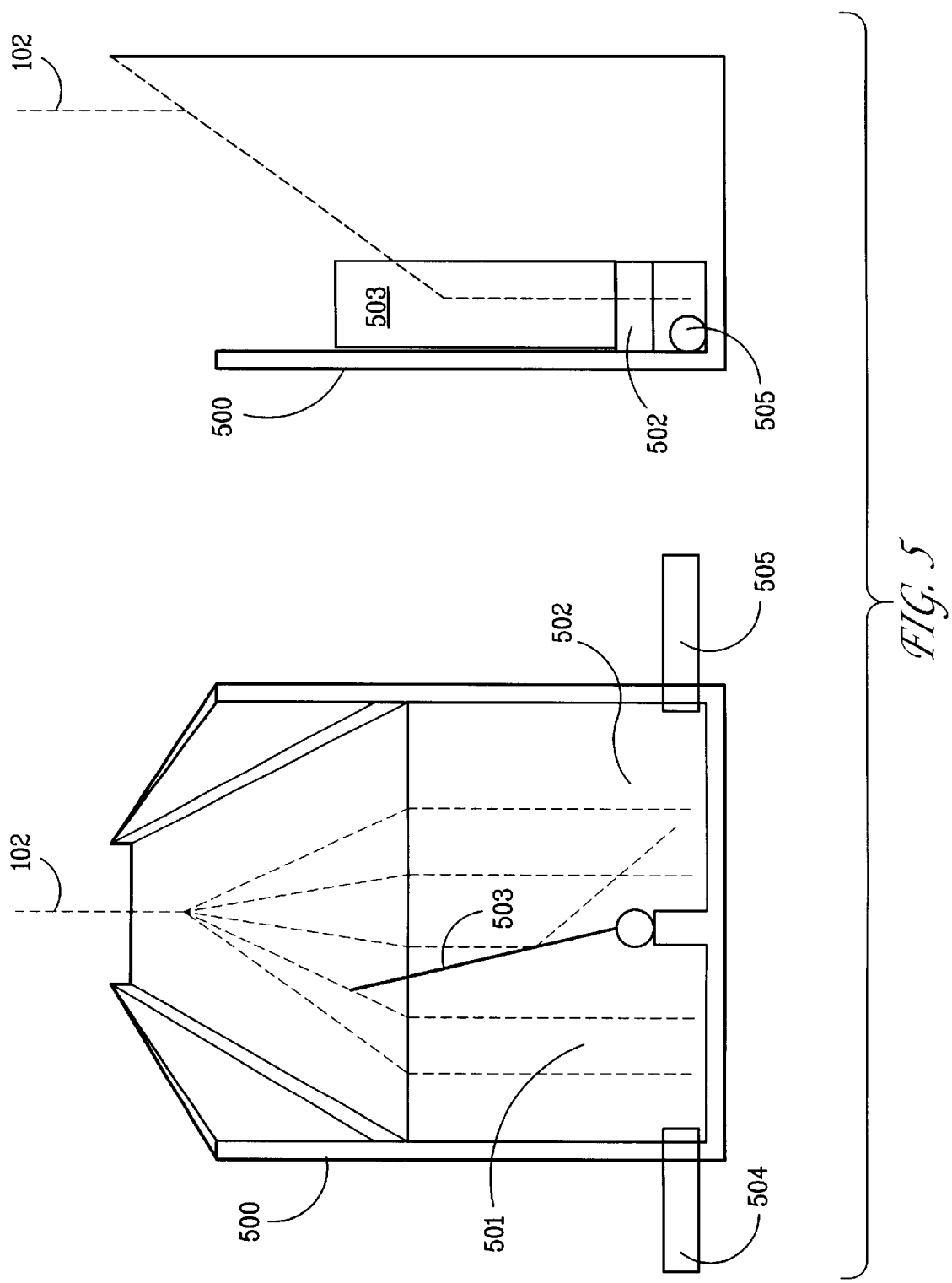
FIG. 5 illustrates the action of a powder feeder according to the present invention with a powder diverter.
Figure 6:
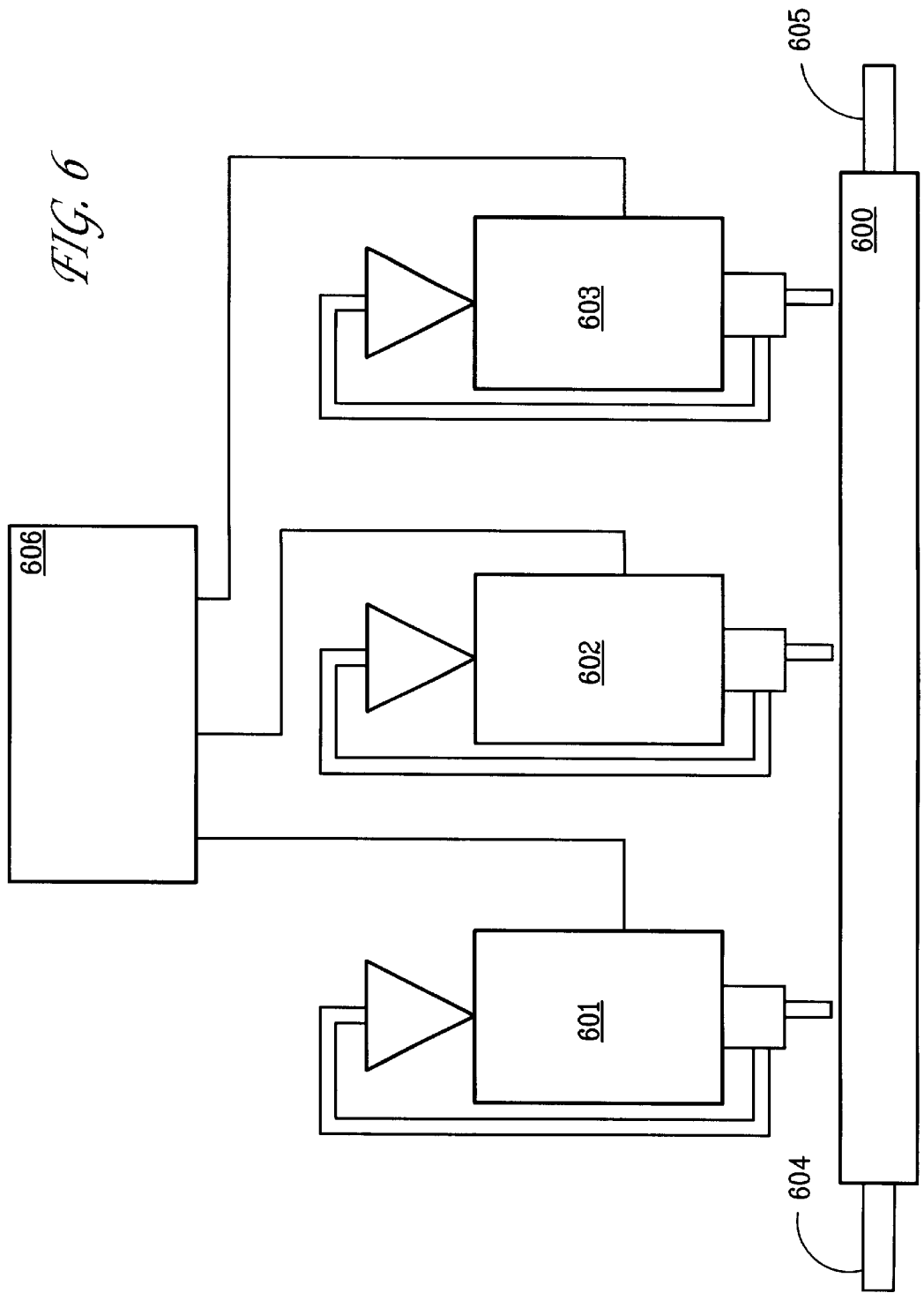
FIG. 6 illustrates schematically a feedback control system for the present invention.

Although the flow of powder can always be shut off by positioning powder collector 108 so that collection aperture 109 does not intersect the flow of powder 102, this technique is often too slow for a desired application. It can be useful, therefore, to include a rapidly-acting powder flow shutoff. This function is often served by placing a solenoid valve into the path of the feeder output. In FIG. 3 the precise location is given as between the powder collector and the orifice, but many other locations are suitable.

Here a pile of powder 300 sits in a powder reservoir 100. The operation of the powder feeder requires that this powder eventually flows through orifice 101. These two components are connected by a solenoid valve, which comprises a solenoid 301 with a plunger 302, positioned so as to block off access to the orifice 101 when the plunger is thrust into valve seal 303. Many other approaches toward powder cutoff mechanisms will be clear to one skilled in the art.

In the implementation of FIG. 1, the powder disperser 103 is simply an inclined flat plate. Beyond having suitable surface properties (e.g., the surface of the plate should not adhere to the powder particles), this is perhaps the simplest approach to obtaining the required functionality. It is possible to imagine rather complex powder dispersers, such as cones rotating about their axis, flat plates spinning powder off its edge, or shaker tables with a dispersing grid of openings at the bottom. Although such complex dispersers would function in the present invention, they are not described in detail because their complexity detracts from the simple designs made possible by the present invention.

There are other powder dispersers which are as simple as that of FIG. 1, but offer a different sort of pattern to the flow of powder. FIG. 4*a* shows a powder disperser in the form of a curved inclined plane 401. When a flow of powder 400 drops onto powder disperser 401, the curvature of the surface (shown as convex relative to the powder) serves to spread the flow of powder 402 over a wider area than is seen when a flat plate with the same inclination is used.

FIG. 4*b* shows a powder disperser 404 in the form of a (nominally) flat plate comprising a number of vertical shafts 405 positioned so as to interact with the flow of powder 402. The location of these shafts allows one to influence the distribution of powder over the surface. In the figure, shafts 405 are positioned in a pattern which will form the flow of powder roughly into a binomial distribution.

Similarly, FIG. 4*c* shows a powder disperser 406 in the form of a nominally flat plate comprising a number of shallow channels 407. The purpose is the same as that described above—to control the distribution of powder.

Other types of powder collectors can be used while satisfying the essential purpose of this component—to capture an operator-variable portion of the flow of powder. An example is shown in FIG. 5, where the flow of powder falls into a double-chambered receptacle 500, comprising a waste receptacle 501, an output receptacle 502 and a pivoting powder diverter 503. The purpose of the powder diverter is to change the relative amount of the flow of powder which is captured by the waste receptacle and by the output receptacle. In FIG. 5 diverter 503 can take the simple form of a flap whose width essentially equals the internal depth of the double-chambered receptacle, mounted with said receptacle so that any powder falling on the right side of the diverter (as shown) reaches the output receptacle, whereas any powder falling on the left side of the diverter enters the waste stream. Clearly, as the diverter is pivoted, the amount of powder reaching the output changes. This adjustment technique is compatible with remote drive and control.

Precision powder feeders according to the present invention can be combined as components in a multiple powder feeder and mixer. Such combination devices can be made in many ways, one of which is illustrated in FIG. 6. Here, the feeder outlets of three precision powder feeders according to the present invention, 601, 602, and 603 are attached to powder combining manifold 600. Within powder combining manifold 600, the streams of powder-gas mixtures output from each of the three powder feeders are mixed together, possibly with the injection of additional carrier gas through inlet 604, and ejected through manifold outlet 605. Each of the powder feeders is functionally connected to a mixture controller 606, which converts an operator-set desired mixture of powders into control values, then sets the powder mass flow rate controllers of the individual powder feeders so as to obtain the desired output mixture.

The examples and implementations described above are intended to illustrate various aspects of the present invention, not to limit the scope thereof. The scope of the invention is set by the claims interpreted in view of the specification.

What is claimed is:

1. A precision powder feeder, comprising:

a) a powder reservoir containing powder;

b) an orifice creating a flow of powder onto a powder disperser;

c) the powder disperser;

d) a powder collector functionally connected to a feeder outlet; and, e) adjustment means which control the proportion of said flow of powder collected by said powder collector.

2. The powder feeder of claim 1, wherein the powder reservoir further comprises means to fluidize powder contained therein.

3. The powder feeder of claim 2, wherein said means to fluidize powder comprise a vibrator.

4. The powder feeder of claim 2, wherein said means to fluidize powder comprises a source of infiltration gas and a gas infiltration device.

5. The powder feeder of claim 4, wherein said gas infiltration device comprises a partially porous powder reservoir inner wall.

6. The powder feeder of claim 4, wherein said gas infiltration device comprises a collar affixed between the powder reservoir and the orifice, said collar comprising gas jets directed into the powder contained in the powder reservoir.

7. The powder feeder of claim 1, further comprising a powder flow shutoff.

8. The powder feeder of claim 7, wherein said powder flow shutoff comprises a solenoid valve positioned between the powder reservoir and the orifice.

9. The powder feeder of claim 1, further comprising an outlet manifold comprising a carrier gas source and a powder entrainment device.

10. The powder feeder of claim 1, further comprising a waste powder recirculation system.

11. The powder feeder of claim 10, wherein said waste powder recirculation system comprises a waste powder collector, a carrier gas source, a waste powder entrainment device, and a powder return manifold.

12. The powder feeder of claim 1, wherein said powder disperser comprises a dispersion surface positioned between said orifice and said collector so that powder flowing from said orifice impacts the dispersion surface and forms a sheet-like flow of powder flowing down the dispersion surface.

13. The powder feeder of claim 12, wherein said dispersion surface is flat.

14. The powder feeder of claim 12, wherein said dispersion surface is curved.

15. The powder feeder of claim 12, wherein said dispersion surface further comprises at least one surface projection positioned to control the powder dispersion pattern.

16. The powder feeder of claim 12, wherein said dispersion surface further comprises a plurality of surface projections distributed so as to control the powder dispersion pattern.

17. The powder feeder of claim 12, wherein said dispersion surface further comprises a plurality of surface channels distributed so as to control the powder dispersion pattern.

18. The powder feeder of claim 1, wherein said adjustment means comprise a mechanism whereby the point at which the flow of powder from said orifice impacts said powder disperser can be varied.

19. The powder feeder of claim 18, wherein said powder collector comprises a collection aperture positioned to collect powder from a portion of the powder disperser.

20. The powder feeder of claim 1, wherein said adjustment means comprise a mechanism whereby the relative position of the powder disperser and the powder collector can be varied.

21. The powder feeder of claim 20, wherein said powder collector comprises a collection aperture which can be moved so as to collect variable portions of the flow of powder.

22. The powder feeder of claim 21, wherein said mechanism comprises an electromechanical drive.

23. The powder feeder of claim 22, wherein said electromechanical drive comprises an electric motor and a rotary encoder.

24. The powder feeder of claim 23, wherein said electromechanical drive comprises a servomotor.

25. The powder feeder of claim 1, wherein said adjustment means comprise a powder diverter separating the flow of powder into an output stream and at least one waste stream.

26. The powder feeder of claim 25, wherein the powder collector collects only the powder in said output stream.

27. The powder feeder of claim 25, wherein the powder diverter comprises a positioning mechanism which allows the proportion of the flow of powder entering the output stream to be varied.

28. The powder feeder of claim 27, wherein the positioning mechanism comprises an electromechanical drive.

29. The powder feeder of claim 28, wherein the electromechanical drive comprises an electric motor and a rotary encoder.

30. The powder feeder of claim 29, wherein the electromechanical drive comprises a servomotor.

31. The powder feeder of claim 9, further comprising a powder mass flow rate controller.

32. The powder feeder of claim 31, wherein said powder mass flow rate controller comprises a carrier gas flow sensor, a total mass flow sensor, a feedback controller, and wherein the adjustment means comprise an electromagnetic drive adapted to vary the rate of the flow of powder.

33. A multiple powder feeder, comprising:

a) a plurality of precision powder feeders in accord with claim 1;

b) a powder combining manifold functionally connected to each of the plurality of precision powder feeders; and, c) a mixture controller functionally connected to the adjustment means of each of the plurality of precision powder feeders.

34. The multiple powder feeder of claim 33, wherein said powder combining manifold comprises:

a) a carrier gas source;

b) a powder mixer; and, c) a powder entrainment device.

35. The multiple powder feeder of claim 33, wherein said plurality of precision powder feeders are in accord with claim 31.

36. The multiple powder feeder of claim 35, wherein said powder combining manifold comprises:

a) a carrier gas source;

b) a powder mixer; and, c) a powder entrainment device.

* * * * *